(12) United States Patent
Luo et al.

(10) Patent No.: US 6,261,717 B1
(45) Date of Patent: Jul. 17, 2001

(54) BATTERY HAVING AN ELECTRODE WITHIN ANOTHER ELECTRODE

(75) Inventors: Weifang Luo, Norwood; Bhupendra K. Patel, Mansfield; Alexander B. Shelekhin, Acton, all of MA (US); Gary T. Viveiros, Tiverton, RI (US); Viet H. Vu, Medway; Douglas Woodnorth, Needham, both of MA (US)

(73) Assignee: The Gillette Company, Boston, MA (US)

( * ) Notice: Subject to any disclaimer, the term of this patent is extended or adjusted under 35 U.S.C. 154(b) by 0 days.

(21) Appl. No.: 09/322,832

(22) Filed: May 28, 1999

(51) Int. Cl.$^7$ ....................................................... H01M 4/02
(52) U.S. Cl. ........................... 429/164; 429/224; 429/229
(58) Field of Search .................... 429/224, 229, 429/164–170, 131, 132, 140; 29/623.1

(56) References Cited

U.S. PATENT DOCUMENTS

| | | |
|---|---|---|
| 2,185,756 | 1/1940 | Spicer . |
| 2,980,747 | 4/1961 | Daly . |
| 4,281,046 | 7/1981 | Davis, Jr. . |
| 4,283,470 | 8/1981 | Freeman et al. . |
| 4,318,968 | 3/1982 | Berger et al. . |
| 4,360,575 | 11/1982 | Brennan . |
| 5,045,415 | 9/1991 | Witehira . |
| 5,248,572 | 9/1993 | Shoji et al. . |
| 5,294,499 | 3/1994 | Furukawa et al. . |
| 5,434,019 | 7/1995 | Zhang et al. . |
| 5,464,709 | * 11/1995 | Getz et al. . |
| 5,472,806 | 12/1995 | Meintjes . |
| 5,482,796 | 1/1996 | Wang et al. . |
| 5,545,492 | 8/1996 | Zito . |
| 5,576,116 | 11/1996 | Sanchez et al. . |
| 5,639,578 | 6/1997 | Urry . |
| 5,674,639 | 10/1997 | Urry . |
| 5,677,080 | 10/1997 | Chen . |
| 5,682,288 | 10/1997 | Wani . |
| 5,821,012 | 10/1998 | McCullough . |
| 5,869,205 | 2/1999 | Mick et al. . |
| 5,948,561 | 9/1999 | Urry . |

FOREIGN PATENT DOCUMENTS

| | | |
|---|---|---|
| 2 622 359 A1 | 4/1989 | (FR) . |
| 1036156 | 7/1966 | (GB) . |
| 2-295063 | 12/1990 | (JP) . |
| 7-326347 | 12/1995 | (JP) . |
| 7-326370 | 12/1995 | (JP) . |
| WO 00/01022 | 6/2000 | (WO) . |

OTHER PUBLICATIONS

Linden, D., Handbook of Batteries, Second Edition, Mc–Graw–Hill, Inc., NY, p. 8.6., 1995, No Month.*

* cited by examiner

Primary Examiner—Gabrielle Brouillette
Assistant Examiner—Susy Tsang
(74) Attorney, Agent, or Firm—Fish & Richardson P.C.

(57) ABSTRACT

A battery includes a cylindrical housing, a first electrode, a second electrode, and a separator. The second electrode includes a plurality of cavities within the first electrode.

37 Claims, 3 Drawing Sheets

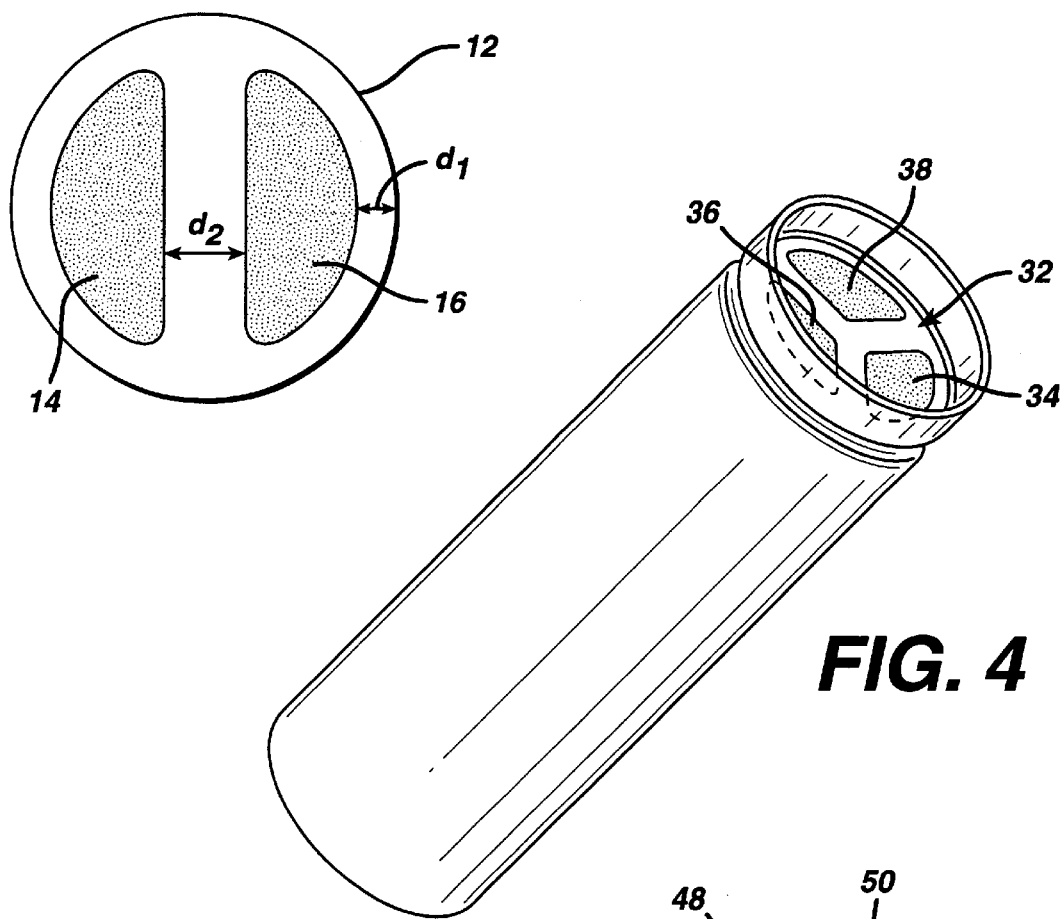
FIG. 3
FIG. 4
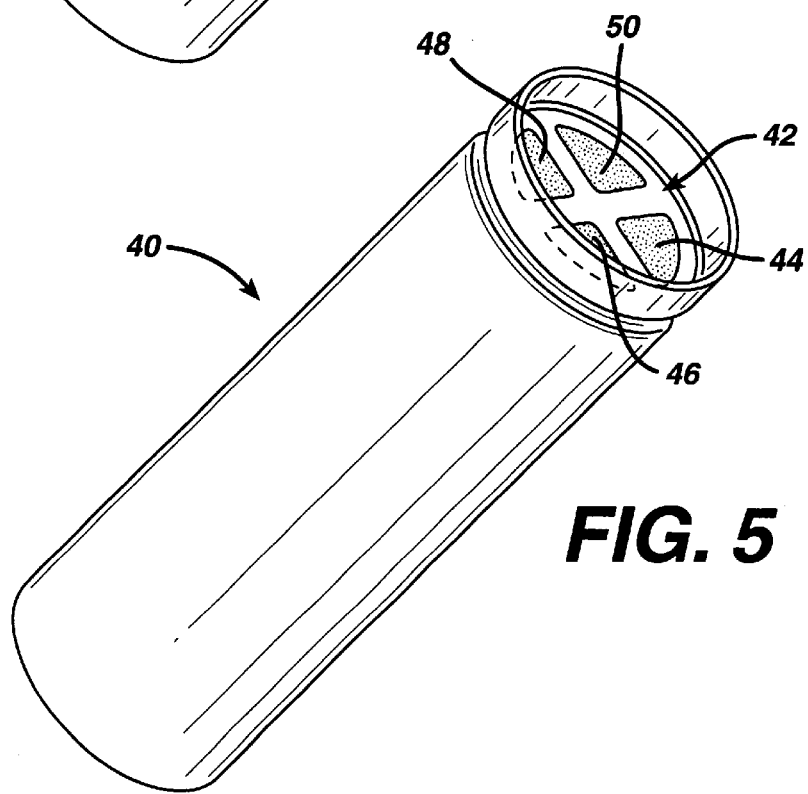
FIG. 5

BATTERY HAVING AN ELECTRODE WITHIN ANOTHER ELECTRODE

BACKGROUND OF THE INVENTION

This invention relates to batteries.

Batteries, such as alkaline batteries, are commonly used as energy sources. Generally, alkaline batteries include a cathode, an anode, a separator, and an electrolytic solution. The cathode is typically formed of an active material (e.g., manganese dioxide), carbon particles, and a binder. The anode can be a gel including an active material (e.g., zinc particles). The separator is usually disposed between the cathode and the anode. The electrolytic solution, which is dispersed throughout the battery, can be a hydroxide solution.

Alkaline batteries include the conventional AA, AAA, AAAA, C, and D batteries commonly sold in stores. These conventional alkaline batteries include a cylindrical container containing a central, cylindrical zinc gel anode surrounded by a ring-shaped manganese dioxide cathode.

It generally is desirable for a battery to have a long life. One measure of the life of a battery is the length of time the battery can discharge under a given load before the voltage drops to an unacceptable level.

Mick et al., U.S. Pat. No. 5,869,205 ("the Mick patent") describes a battery which has an enhanced "service performance" (i.e., a longer life). According to Mick, the service performance in conventional alkaline batteries is limited by the restricted "anode-to-cathode interface area" in the alkaline batteries. The Mick patent gets around this restriction by replacing the center cylindrical cavity that, for example, is the zinc anode in conventional alkaline batteries with a plurality of cylindrical cavities that together make up the anode. By replacing, for example, a central zinc anode with a zinc anode including multiple cavities, the interface area between the zinc anode and the cathode is increased, providing the enhanced service performance.

SUMMARY OF THE INVENTION

The life, or service performance, of a battery also depends on the efficiency with which the battery uses the active materials of the anode and the cathode during discharge. This invention relates to a battery including multiple cavities which efficiently use the active materials in the anode and cathode.

More particularly, in one aspect the invention features a battery including a housing, a first electrode within the housing, a second electrode within the housing, and a separator between the first and second electrodes. The second electrode includes a plurality of cavities within the first electrode. The battery has a length and, at some position along the length of the battery, each of the cavities is a minimum distance ($d_1$) from the housing and a minimum distance ($d_2$) from each of the other cavities, with each ratio $d_2:d_1$ for each cavity being between 1.5:1 and 2.5:1, preferably between 1.7:1 and 2.3:1, more preferably between 1.8:1 and 2.2:1, and most preferably between 1.9:1 and 2.1:1. Each ratio $d_2:d_1$ can be the average ratio $d_2:d_1$ along the length of the battery. The ratio can be determined, for example, at the mid-point along the length of the battery, or a third of the distance along the length of the battery, or two-thirds of the distance along the length of the battery. Preferably, at least 50 percent of, more preferably at least 75 percent of, and most preferably substantially the entire outer circumference of each cavity at that position fulfills this relationship. The housing preferably is cylindrical.

The minimum distance ($d_1$) between a cavity and the housing can be measured by determining the minimum distance between a surface of the first electrode adjacent the cavity and a surface of the first electrode adjacent the housing. The minimum distance ($d_2$) between two cavities is measured at the same position along the length of the battery by determining the minimum distance between a surface of the first electrode adjacent one cavity and a surface of the first electrode adjacent the second cavity.

Preferably, the ratio $d_2:d_1$, for each cavity is an average of between 1.5:1 and 2.5:1, more preferably between 1.7:1 and 2.3:1, and most preferably between 1.8:1 and 2.2:1 or even between 1.9:1 and 2.1:1.

In another aspect, the invention also features a battery including a housing, a first electrode within the housing, and a separator between the first and second electrodes. But this aspect of the invention, the second electrode includes two generally D-shaped cavities within the first electrode. Preferably, the flat side of the D-shaped cavities face each other, and the cavities have the ratio $d_2:d_1$ discussed above.

In a third aspect, the invention again features a battery having a housing, a first electrode within the housing, and a separator between the first electrode and the second electrode. But this aspect of the invention, the second electrode includes three or more generally triangular-shaped cavities within the first electrode. Preferably, the housing is cylindrical and a corner of each cavity is directed towards the center of the battery, and when this is the case the side of the triangle generally aligned with the cylindrical housing is curved to match the curvature of the housing. Preferably, the cavities have the ratio $d_2:d_1$, discussed above.

In preferred embodiments, the first electrode is a cathode including manganese dioxide and the second electrode is an anode including zinc. The battery may be, for example, an AA, AAA, AAAA, C, or D battery.

The invention also relates to a battery in which the ratio $d_2:d_1$, described above is present at least once for at least one of the cavities.

Generally, the invention also relates to the current collector/seal arrangement that can be used with the multi-cavity batteries described above. The battery includes a top cap on an end of the battery, a seal between the top cap and the anode and cathode, and a multi-prong current collector. As end of each prong is electrically connected with the top cap, and each prong passes through the seal and into one of the anode cavities.

Other features and advantages of the invention will be apparent from the description of the preferred embodiments thereof, and from the claims.

BRIEF DESCRIPTION OF THE DRAWINGS

FIG. 3 is a cross-sectional view of the battery in FIG. 1, taken at III—III in FIG. 2;

FIG. 4 is a top view of a battery including an anode consisting of three generally triangle-shaped cavities, without top cap, seal, and current collector; and FIG. 5 is a top view of a battery including an anode consisting of four generally triangle-shaped cavities, without top coat, seal, and current collector.

DESCRIPTION OF THE PREFERRED EMBODIMENTS

Figure 1:
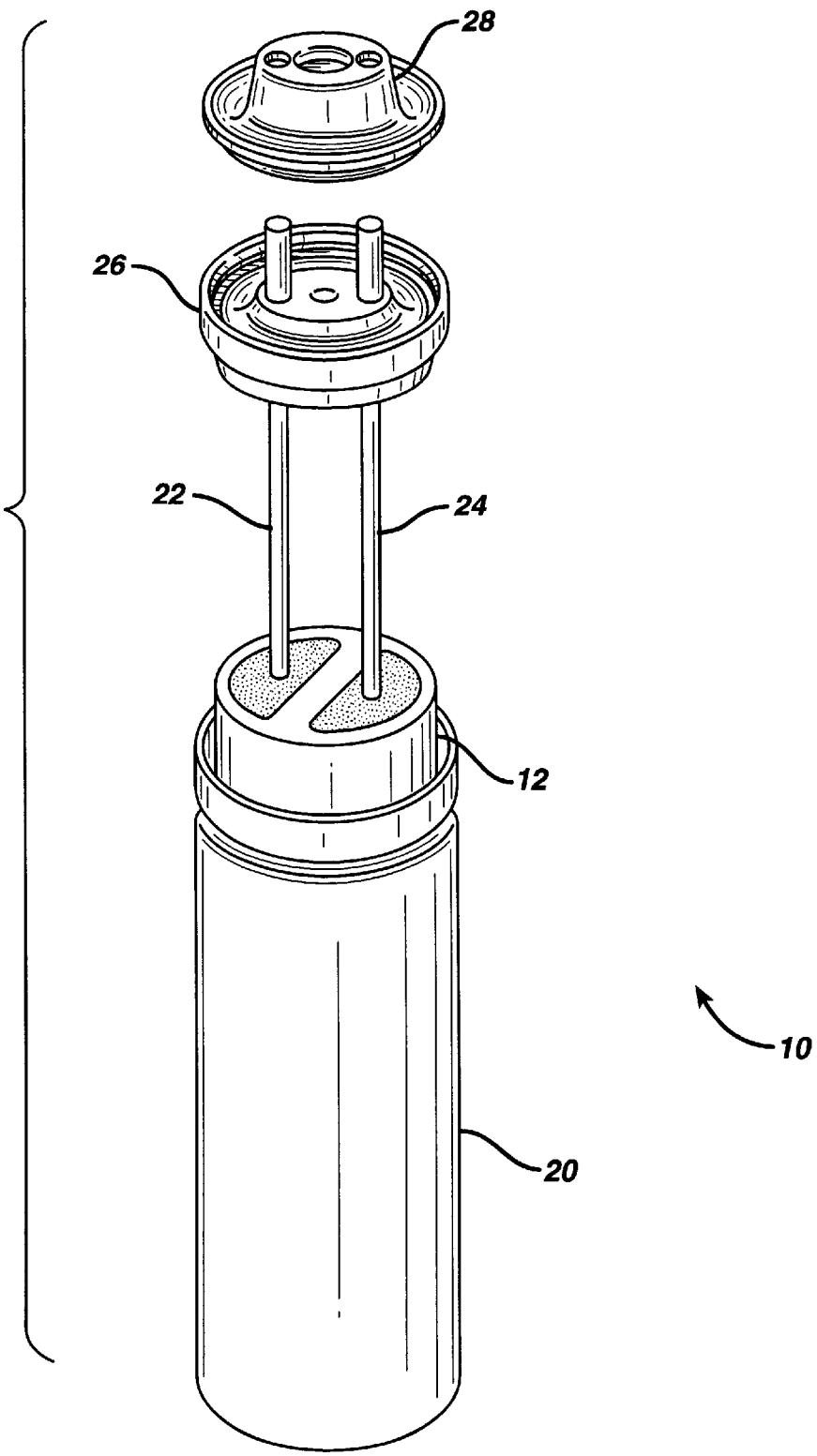
FIG. 1 is an exploded view of a battery, including an anode consisting of two general D-shaped cavities.
Figure 2:
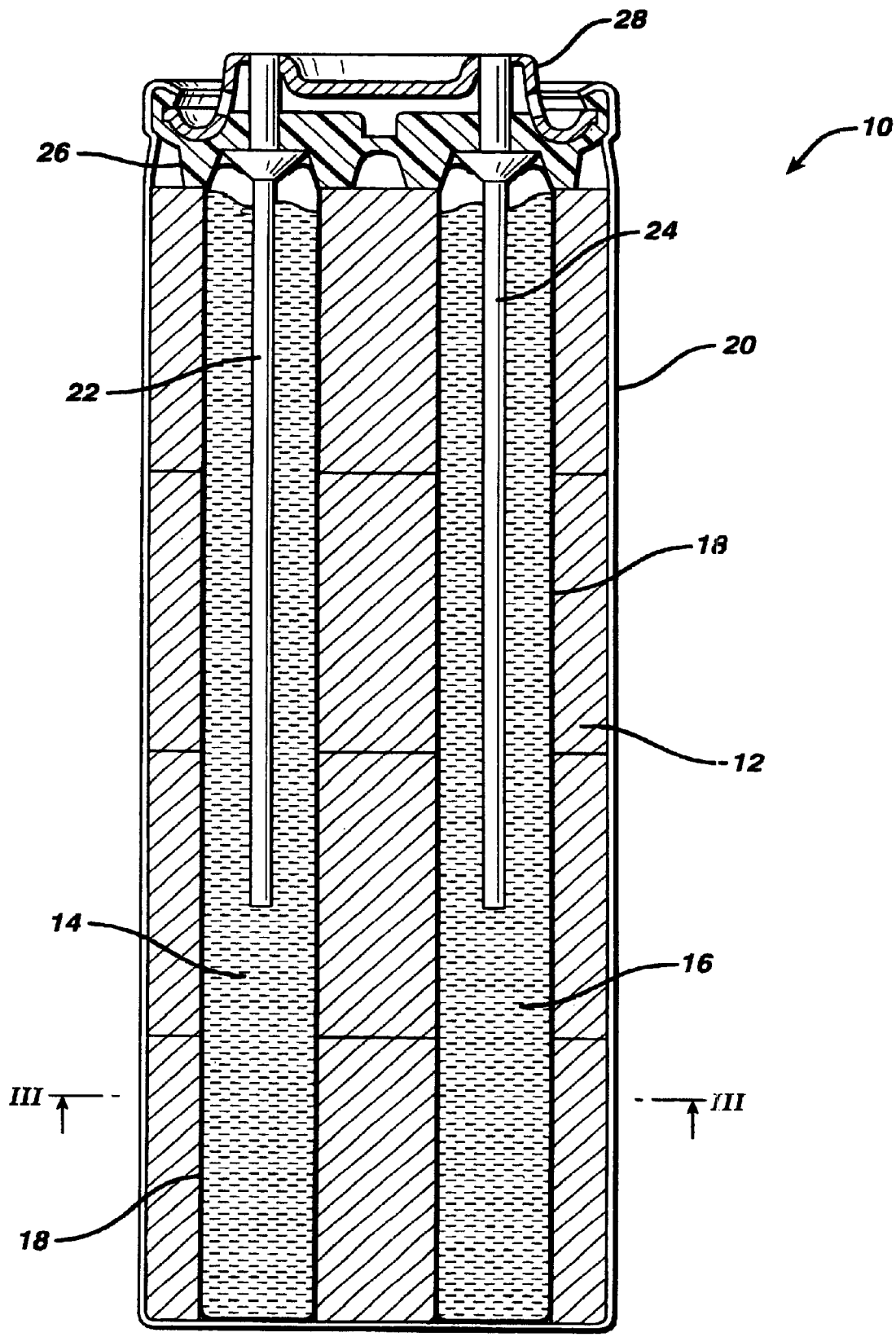
FIG. 2 is a side-sectional view of the battery in FIG. 1, taken through the center of the battery.

Referring to FIGS. 1–3, battery 10 includes a cathode 12, an anode consisting of two generally D-shaped cavities 14 and 16, separators 18, and cylindrical housing 20. Battery 10 also includes a current collector that has two prongs 22 and 24 passing through seal 26 into anode cavities 14 and 16, respectively. The end of each prong is connected to negative metal top cap 28, which serves as the negative terminal for the battery. The cathode is in contact with the housing, and the positive terminal of the battery is at the opposite end of the battery from the negative terminal. An electrolytic solution is dispersed throughout battery 10.

Cathode 12 includes manganese dioxide, carbon particles, and a binder.

Any of the conventional forms of manganese dioxide used for cathodes can be used. The preferred manganese dioxide is EMD, although CMD can also be used. Distributors of such manganese dioxides include Kerr McGee, Co. (Trona D), Chem Metals, Co., Tosoh, Delta Manganese, Mitsui Chemicals and JMC. Generally, the cathode will include between 80% and 88% of manganese dioxide by weight.

The carbon particles also can be any of the conventional carbon particles used in cathodes. They can be synthetic or nonsynthetic, and they can be expanded or nonexpanded. In certain embodiments, the carbon particles are nonsynthetic, nonexpanded graphite particles. In these embodiments, the graphite particles preferably have an average particle size of less than about 20 microns, more preferably from about 2 microns to about 12 microns, and most preferably from about 5 microns to about 9 microns as measured using a Sympatec HELIOS analyzer. Nonsynthetic, nonexpanded graphite particles can be obtained from, for example, Brazilian Nacional de Grafite (Itapecirica, MG Brazil (MP-0702X). Generally, the cathode will include between 5% and 8% of carbon particles by weight.

Examples of binders include polyethylene powders, polyacrylamides, Portland cement and fluorocarbon resins, such as PVDF and PTFE. An example of a polyethylene binder is sold under the tradename COATHYLENE HA-1681 (Hoescht). Generally, the cathode includes between 0.1 percent to about 1 percent of binder by weight.

Cathode 12 can include other additives. Examples of these additives are disclosed in U.S. Pat. No. 5,342,712, which is hereby incorporated by reference. Cathode 12 may include, for example, from about 0.2 weight percent to about 2 percent $TiO_2$ weight.

The electrolyte solution also is dispersed through cathode 12, and the weight percentages provided above are determined after the electrolyte solution has been dispersed.

The anode can be formed of any of the standard zinc materials used in battery anodes. For example, anode 14 can be a zinc gel that includes zinc metal particles, a gelling agent and minor amounts of additives, such as gassing inhibitor. In addition, a portion of the electrolyte solution is dispersed throughout the anode.

The zinc particles can be any of the zinc particles conventionally used in gel anodes. Other examples of zinc particles used in the anode include these described in U.S. Ser. No. 08/905,254. U.S. Ser. No. 09/115,867, and U.S. Ser. No. 09/156,915, which are assigned to the assignee in the present application and are hereby incorporated by reference. Generally, the anode includes between 67% and 71% of zinc particles by weight.

Gelling agents that can be used in anode 14 include polyacrylic acids, grafted starch materials, salts of polyacrylic acids, polyacrylates, carboxymethylcellulose or combinations thereof. Examples of such polyacrylic acids are CARBOPOL 940 and 934 (B.F. Goodrich) and POLY-GEL 4P (3V), and an example of a grafted starch material is WATERLOCK A221 (Grain Processing Corporation, Muscatine, IA). An example of a salt of a polyacrylic acid is ALCOSORB G1, (Ciba Specialties). The anode generally includes from 0.1 percent to about 1 percent gelling agent by weight. These weight percentages correspond to when the electrolytic solution is dispersed throughout the anode.

Gassing inhibitors can be inorganic materials, such as bismuth, tin, lead and indium. Alternatively, gassing inhibitors can be organic compounds, such as phosphate esters, ionic surfactants or nonionic surfactants. Examples of ionic surfactants are disclosed in, for example, U.S. Pat. No. 4,777,100, which is hereby incorporated by reference.

Separators 18 can have any of the conventional designs for battery separators. In some embodiments, separators 18 can be formed of two layers of nonwoven, non-membrane material with one layer being disposed along a surface of the other. To minimize the volume of separators 18 while providing an efficient battery, each layer of nonwoven, non-membrane material can have a basis weight of about 54 grams per square meter, a thickness of about 5.4 mils when dry and a thickness of about 10 mils when wet. In these embodiments, the separator preferably does not include a layer of membrane material or a layer of adhesive between the nonwoven, non-membrane layers. Generally, the layers can be substantially devoid of fillers, such as inorganic particles.

In other embodiments, separators 18 include an outer layer of cellophane with a layer of nonwoven material. The separator also includes an additional layer of nonwoven material. The cellophane layer can be adjacent cathode 12 or the anode. Preferably, the nonwoven material contains from about 78 weight percent to about 82 weight percent PVA and from about 18 weight percent to about 22 weight percent rayon with a trace of surfactant. Such nonwoven materials are available from PDM under the tradename PA36.

The electrolytic solution dispersed throughout battery 10 can be any of the conventional electrolytic solutions used in batteries. Typically, the electrolytic solution is an aqueous hydroxide solution. Such aqueous hydroxide solutions include potassium hydroxide solutions including, for example, between 33% and 38% by weight percent potassium hydroxide, and sodium hydroxide solutions.

Housing 20 can be any conventional housing commonly used in primary alkaline batteries. The housing typically includes an inner metal wall and an outer electrically non-conductive material such as heat shrinkable plastic. optionally, a layer of conductive material can be disposed between the inner wall and the cathode 12. This layer may be disposed along the inner surface of wall, along the outer circumference of cathode 12 or both. This conductive layer can be formed, for example, of a carbonaceous material. Such materials include LB1000 (Timcal), ECCOCOAT 257 (W.R. Grace & Co.), EIECTRODAG 109 (Acheson Industries, Inc.), ELECTRODAG 112 (Acheson) and EB0005 (Acheson). Methods of applying the conductive layer are disclosed in, for example, Canadian Patent No. 1,263,697, which is hereby incorporated by reference.

The current collector is made from a suitable metal, such as brass. Seal 26 can be made, for example, of nylon.

An example of battery 10 can be prepared as follows. A cathode mixture is prepared by combining 85.5% EMD (from Kerr McGee), 7.3% graphite (COATHYLENE HA1681 from Hoechst), 0.3% polyethylene binder (MP-0702X from Nacional de Graphite), and 6.9% electrolyte solution. The mixture then is compressed under pressure in a die slotted into a two "D" cavity. The formed pellet was attracted out of the die by a counter punch. Four pellets (for a AA battery) or three pellets (for a AAA battery) were aligned vertically by half-moon mandrels and slipped into the housing and then recompacted inside the housing to make contact with the housing. The separator (P.G.I. NON-WOVEN 7638) is placed within each cavity. An anode mixture was prepared by combining (in weight percentages) 70% zinc powder (Zinc Corp. of America 1216), a gelling agent (CARBOPOL 940 from BF Goodrich), and 30% electrolyte (composed of 98.6% liquid electrolyte and 1.4% of the dissolved gelling agent). The anode mixture then was dispersed into the cavities. The top assembly including top cap 28, the current collector, and seal 26, was placed over the housing and mechanically crimped over to seal the battery. A sealant (SPEC SEAL) was applied to the side of the housing prior to the assembly.

In battery 10, anode cavities 14 and 16 are positioned equal distances ($d_1$,) from housing 20 and equal distances ($d_2$) from each other. The ratio of $d_2:d_1$, is approximately 2:1 around the entire circumference of each cavity. During use of battery 10, the cathode material closest to the anode cavities will be consumed first, and over time areas of consumed cathode material form around each cavity. Because $d_2$ is approximately twice $d_1$, as the area of consumed cathode material expands it will tend to reach housing 20 and the area of consumed cathode material expanding from the other cavity after approximately the same time. As a result, the efficiency of consumption of the cathode material is maximized, thus increasing the life of the battery.

In contrast, referring to FIG. 3, in the battery described in the Mick patent that includes four anode cavities, for the anode cavities across from each other $d_2$ is much greater than two and a half times $d_1$. Thus, as the battery is used, the area of consumed cathode material around each cavity generally will reach the housing before the areas of consumed cathode material around cavities across from each other meet.

Other embodiments are within the claims. For example, referring to FIG. 4, a battery includes a cathode 32 and an anode comprising three triangle-shaped cavities (34, 36, 38) that also have a $d_2:d_1$, ratio of approximately 2:1. Similarly referring to FIG. 5, a battery 40 includes a cathode 42 and an anode comprising four triangle-shaped cavities 44, 46, 48, and 50 that also have a $d_2:d_1$ ratio of approximately 2:1.

In addition, the positions of the cathode and the anode may be reversed.

The battery also may be provided with a switch that allows a user to select which cavity or cavities will be in operation at a given time. A switch on the battery in FIGS. 1–3, for example, may have three positions. One position connects prong 22 to top cap 28, but disconnects prong 24 from top cap 28; another position connects prong 24 to top cap 28, but disconnects prong 22 from top cap 28; the third position connects both prongs 22 and 24 to top cap 28. Analogous switches may be used with the batteries in FIGS. 4 and 5.

What is claimed is:

1. A battery comprising:
   a housing;
   a first electrode within the housing;
   a second electrode comprising a plurality of cavities within the first electrode; and
   a separator between each of the cavities and the first electrode;
   wherein each of the cavities is a minimum distance, ($d_1$) from the housing and a minimum distance, ($d_2$) from each of the other cavities with each ratio $d_2:d_1$, for each of the cavities being between 1.5:1 and 2.5:1.

2. The battery of claim 1, wherein each ratio $d_2:d_1$, for each of the cavities is between 1.7:1 and 2.3:1.

3. The battery of claim 1, wherein each ratio $d_2:d_1$ for each of the cavities is between 1.8:1 and 2.2:1.

4. The battery of claim 1, wherein each ratio $d_2:d_1$ for each of the cavities is between 1.9:1 and 2.1:1.

5. The battery of claim 1, wherein the second electrode consists of two of the cavities.

6. The battery of claim 5, wherein the cavities are generally D-shaped.

7. The battery of claim 6, wherein the D-shaped cavities each include a flat side, and the flat sides face each other.

8. The battery of claim 1, wherein the second electrode comprises three of the cavities.

9. The battery of claim 8, wherein the cavities are generally triangle-shaped and each has a corner directed towards the center of the battery.

10. The battery of claim 1, wherein the second electrode comprises four of the cavities.

11. The battery of claim 10, wherein the cavities are generally triangle-shaped and each has a corner directed towards the center of the battery.

12. The battery of claim 1, wherein the first electrode is a cathode.

13. The battery of claim 12, wherein the cathode comprises manganese dioxide.

14. The battery of claim 12, wherein the second electrode is an anode comprising zinc.

15. The battery of claim 13, wherein the second electrode is an anode comprising zinc.

16. The battery of claim 1, wherein the battery is a AA battery.

17. The battery of claim 1, wherein the battery is a AAA battery.

18. The battery of claim 1, wherein the battery is a AAAA battery.

19. The battery of claim 1, wherein the battery is a C battery.

20. The battery of claim 1, wherein the battery is a D battery.

21. The battery of claim 1, wherein the battery has a length and each ratio $d_2:d_1$ is measured halfway along the length.

22. The battery of claim 1, wherein the battery has a length and each ratio $d_2:d_1$ is measured a third of the way along the length.

23. The battery of claim 1, wherein the battery has a length and each ratio $d_2:d_1$ is measured two thirds of the way along the length.

24. The battery of claim 1, the battery further including a top cap electrically connected to the second electrode through a current collector, the current collector including, for each cavity, a prong extending from the top cap into the cavity.

25. The battery of claim 24, the battery further including a seal located between the top cap and the first and second electrodes, wherein each of the prongs passes through the seal.

26. The battery of claim 1, wherein the housing is cylindrical.

27. The battery of claim 1, wherein the cavities are cylindrical.

28. A battery comprising:
   a housing;
   a cathode within the housing;

an anode comprising two generally triangle-shaped cavities comprising zinc within the cathode; and a separator between each of the cavities and the cathode.

29. The battery of claim 28, wherein the anode comprises three generally triangle-shaped cavities comprising zinc within the cathode.

30. The battery of claim 29, wherein a corner of each of the generally triangle-shaped cavities is directed towards the center of the battery.

31. The battery of claims 28, wherein the anode comprises four generally triangle-shaped cavities comprising zinc within the anode.

32. The battery of claim 31, wherein a corner of each of the generally triangle-shaped cavities is directed towards the center of the battery.

33. The battery of claim 28, wherein the cathode comprises manganese dioxide.

34. The battery of claim 28, the battery further including a top cap electrically connected to the anode through a current collector, the current collector including, for each cavity, a prong extending from the top cap into the cavity.

35. The battery of claim 34, the battery further including a seal located between the top cap and the cathode and anode, wherein each of the prongs passes through the seal.

36. The battery of claim 28, wherein the housing is cylindrical.

37. A battery comprising:

a housing;

a cathode comprising manganese dioxide;

an anode comprising two generally triangle-shaped cavities within the cathode; and a separator between each of the cavities and the cathode.

* * * * *

UNITED STATES PATENT AND TRADEMARK OFFICE
CERTIFICATE OF CORRECTION

PATENT NO. : 6,261,717 B1
DATED : July 17, 2001
INVENTOR(S) : Weifang Luo et al.

It is certified that error appears in the above-identified patent and that said Letters Patent is hereby corrected as shown below:

<u>Title page,</u>
Item [56], FOREIGN PATENT DOCUMENTS, replace "6/2000" with -- 1/2000 --.

<u>Column 7,</u>
Line 10, replace "claims" with -- claim --.

Signed and Sealed this

Twenty-eighth Day of January, 2003

JAMES E. ROGAN
*Director of the United States Patent and Trademark Office*